United States Patent
Mimone

(10) Patent No.: US 10,329,743 B2
(45) Date of Patent: Jun. 25, 2019

(54) EFFICIENT WATER UTILIZATION SYSTEM

(76) Inventor: Izchak Gago Mimone, Lod (IL)

(*) Notice: Subject to any disclaimer, the term of this patent is extended or adjusted under 35 U.S.C. 154(b) by 630 days.

(21) Appl. No.: 14/239,789

(22) PCT Filed: Aug. 21, 2012

(86) PCT No.: PCT/IL2012/050319
§ 371 (c)(1),
(2), (4) Date: May 29, 2014

(87) PCT Pub. No.: WO2013/027216
PCT Pub. Date: Feb. 28, 2013

(65) Prior Publication Data
US 2014/0326331 A1    Nov. 6, 2014

Related U.S. Application Data

(60) Provisional application No. 61/525,772, filed on Aug. 21, 2011.

(51) Int. Cl.
*E03B 1/04*    (2006.01)
*E03D 5/00*    (2006.01)
*F16K 31/24*   (2006.01)
*E03B 3/03*    (2006.01)

(52) U.S. Cl.
CPC .............. *E03B 1/042* (2013.01); *E03B 1/041* (2013.01); *E03D 5/003* (2013.01); *F16K 31/24* (2013.01); *E03B 3/03* (2013.01); *E03B 2001/045* (2013.01); *E03B 2001/047* (2013.01); *Y02A 20/106* (2018.01); *Y02A 20/108* (2018.01); *Y10T 137/6969* (2015.04); *Y10T 137/7358* (2015.04); *Y10T 137/7439* (2015.04); *Y10T 137/7737* (2015.04); *Y10T 137/7837* (2015.04)

(58) Field of Classification Search
USPC ............................................................ 4/665
See application file for complete search history.

(56) References Cited

U.S. PATENT DOCUMENTS

| 5,406,657 A * | 4/1995 | Donati ...................... E03B 1/04 4/415 |
| 5,557,812 A * | 9/1996 | Sayant ...................... E03B 1/04 4/665 |
| 5,845,346 A * | 12/1998 | Johnson, Jr. ............... E03B 1/04 4/665 |
| 2013/0213098 A1* | 8/2013 | Hsu ....................... D06F 39/006 68/18 R |

* cited by examiner

*Primary Examiner* — Lauren A Crane

(57) ABSTRACT

A system for collecting and accumulating excess water from one or more in-building sources and delivering it to one or more flushing toilet tanks and possibly also to one or more other in-building consumption devices, such as washing machines or utility faucets. The in-building sources may include any of condensate from an air conditioner, cool water in a hot water supply pipe emerging during initial flow, treated waste water and collected rain- or snow water. At the heart of the disclosed system is an accumulation tank of large capacity, having at least two inlets and at least one outlet. One of the inlets is connected to the main water supply system and includes a valve, configured to let fresh water flow into the main tank whenever the level of the water stored therein falls below a given height. Each outlet is connected to a conduit, conveying water from the accumulation tank to one or more toilet flushing tanks, as their only source, and possibly to other water consumption devices.

13 Claims, 15 Drawing Sheets

EFFICIENT WATER UTILIZATION SYSTEM

Priority is claimed from U.S. provisional patent application No. 61/525,772, filed 21 Aug. 2011 under the title "Washing tanks system uses air conditioner water and other sources excess water"

TECHNICAL FIELD

The present invention relates to in-building water distribution systems and, in particular, to a system for utilizing excess water from in-building sources that would otherwise be wasted.

BACKGROUND ART

Water is increasingly becoming a scarce resource, especially in arid regions of the world, and its efficient utilization is therefore becoming imperative—both economically and in terms of national goals. In buildings—both residential and commercial—a substantial portion of water consumption, estimated at between 30% and 50%, is for flushing toilets. Various means for reducing the amount of water needed for toilet flushing are in general use—notably efficient flushing mechanisms that require a smaller quantity of water per flush and means for selective variable quantity flushing (e.g. dual quantity flush). These, however, are not sufficient and a greater degree of saving is desired.

Generally, all the water currently fed to toilet flushing tanks comes from the main water supply line, which generally is connected to the municipal water supply system. This water is pure enough to serve also for all other purposes, such as washing and drinking. Fortunately, toilet flushing water need not be so pure and therefore alternate sources available in buildings can be contemplated for this purpose. These may include—
  (a) condensate water from air-conditioners,
  (b) water from water heaters that has cooled in distribution pipes and is normally wasted while waiting for fresh hot water to arrive and
  (c) so-called gray water from water re-use systems, utilizing waste water from sinks, bathtubs and showers.

A further source may be collected rain- and snow water. Water from all these sources, and similar ones, is here collectively referred to as excess water.

There may be also other uses in a building for water from alternate sources, such as any of those listed above, to replace water from the main supply. Such uses may include inter alia feeding washing machines and cleaning floors.

Japanese patent JP9280592A discloses apparatus, comprising a storage tank for accumulating collected condensate water from one or more air-conditioners, the storage tank being configured to quickly and automatically refill the tank of a flushing toilet immediately after it has been operated and before any substantial amount of water has been drawn from the main supply. This apparatus has several drawbacks, including (a) that it may feed only one flushing tank, (b) that the amount of water that may be accumulated in the storage tank is equal to that required to fill the flushing tank once only and (c) that the accumulated water cannot be used for any other purpose, such as mentioned above. Furthermore, there is not disclosed means for utilizing water from any of the other alternate sources listed above.

There is thus a need for a system that can accumulate any desirable amount of excess water from one or more alternate sources in a building and deliver any of the accumulated water, as needed, to one or more flushing toilets and possibly also to other water consumption devices—for other uses.

DISCLOSURE OF INVENTION

According to the present invention there is disclosed a system for collecting and accumulating excess water from one or more in-building sources, as available, and delivering it to one or more flushing toilet tanks and possibly also to one or more other in-building consumption devices, such as washing machines or utility faucets. The in-building sources may include, but are not limited to, any of—
  condensate that drips from the evaporator coil of an air conditioner,
  cool water in a hot water supply pipe emerging during initial flow,
  treated waste water (so-called gray water) and
  collected rain- or snow water.

At the heart of the disclosed system is a closed tank of large capacity, to be interchangeably referred to as the Accumulation Tank (AT), Storage Tank or Main Tank. The term "large capacity" means, in the present context, that the tank can hold an amount of water, sufficient to fill a flushing toilet tank a relatively large number of times. Preferably the AT has sufficient capacity to accumulate excess water from all sources over 24 hours, thus being independent of diurnal variations in their availability. The accumulation tank has at least two inlets and at least one outlet. One of the inlets is connected to the main water supply system and includes a valve, configured to let fresh water flow into the main tank whenever the level of the water stored therein falls below a given height. A mechanism for carrying out this function is disclosed below. The other inlets are connected each to a conduit that conveys water from a corresponding type of an in-building source, there being possibly a plurality of sources of the same type connected to said conduit; for example, there may be several air conditioners from which condensate water flows through a common conduit to a corresponding inlet in the main tank. Each outlet is connected to a conduit, configured to convey water from the main tank to one or more toilet flushing tanks or other water consumption devices.

The provision of automatic inflow of fresh water into the AT whenever the water level inside is low, enables connecting its outlet conduits to each flushing tank and to any other consumption device as the sole source of cold water (i.e. replacing the normal connection to the main water supply). This has the advantage of maximally utilizing excess water, when available, while automatically assuring uninterrupted water supply to the consumption devices. Another advantage is the relative simplicity of installation, in that a suitable pipe, leading from an outlet of the AT, may be connected directly to the cold inlet port of the consumption device, in place of (and not in addition to) the normal supply pipe.

Water vapor condensed on the evaporator heat-exchanger (or coil) of an air-conditioner usually drips down and is collected in a pan, where it is available for the currently disclosed system. The evaporator is generally located in the indoor unit of the air-conditioner when the latter is used for cooling (primarily during the hot season), but may also be located in the outdoors unit when the air-conditioner is used for heating (so-called reverse cycle), as is practical in some regions during the cold season. The present system is preferably configured to collect condensate from both indoor- and outdoor units.

Water in hot-water pipes that lead to water outlets at devices such as bathtubs, showers and sinks, usually cools down while stationary between uses and is thus generally not usable and is left to drain out. The disclosed system is configured to tap this water and divert it to the accumulation tank. This is done by providing a thermal water diverter (TWD) and interjecting it in the hot-water supply pipe that leads to one or more outlets. The TWD is configured to divert water from the hot-water pipe while, and only while, it is cool (i.e. having a temperature below a given value) and direct it into another pipe that leads to the AT. A novel mechanism for carrying out such diversion, based on one or more thermally-activated valves, is disclosed below. The activator in such a valve is preferably based on the effect of expansion of a bi-phase fluid upon evaporation when in thermal contact with hot water. Further disclosed is a novel mechanism that limits the duration of such a diversion—so as to avoid waste of fresh water in cases that the heating system for the hot water is not operative (and therefore no change in temperature is sensed by the TWD to stop the diversion). The disclosed mechanism may also be applied generally to limiting flow duration of any liquid within any other system.

More specifically, there is disclosed a system for collecting and accumulating excess water from one or more sources in a building and delivering it to one or more flushing toilet tanks as required by any of them, the system comprising—
    an accumulation tank, including at least one excess-water inlet port and at least one outlet port,
    at least one inlet pipe, connecting between any of the sources and a corresponding one of the excess-water inlet ports, and—
    an outlet pipe, connecting between each of the outlet ports and corresponding one or more of the flushing toilet tanks;
    wherein
    the accumulation tank further includes a fresh-water inlet port and a water level control mechanism, which includes a valve, connected to the fresh-water inlet port; the system further comprises a pipe connecting between the fresh-water inlet port and the main water supply system in the building;
    the control mechanism is configured to let fresh water flow into the accumulation tank whenever the level of accumulated water in the tank is below a given value; and
    the connection between any of the outlet pipes and any corresponding flushing toilet tank is at any time the sole inlet connection of that tank.

A pipe may additionally connect between any of the outlet ports and one or more other water consumption devices, including a washing machine or a utility faucet. the sources may be condensate from an air-conditioner or cooled down water from a hot-water supply pipe or both. Further sources may be collected rain water or melted snow or treated waste water.

As a further feature, when a source is cooled-down water from a hot-water supply pipe, the system comprises a thermal water diverter, interjected into the hot-water supply pipe and configured to divert water from the pipe to the accumulation tank while, and only while, the temperature of water in the pipe is below a given value. Preferably, the thermal water diverter includes at least one thermally actuated valve, which, further, includes an actuator that contains a bi-phase fluid. As an additional feature, the system further comprises a flow duration limiter, interjected between the water diverter and the accumulation tank and configured to block the flow of diverted water into the accumulation tank upon the elapse of a given period of time from the inception of such flow. Preferably, the flow duration limiter includes a water-pressure actuated valve.

In another aspect of the invention, there is disclosed an accumulation tank, configured to be installed in a system for collecting and accumulating excess water from one or more sources in a building and delivering it to one or more flushing toilet tanks as required by any of them, the accumulation tank being constructed essentially as described hereabove.

As a further feature, the control mechanism in the accumulation tank further includes a lever, attached to the valve, and a floating weight, attached to the lever by means of a flexible string, and is configured so that while the weight floats on water accumulated in the tank, the valve is closed and while the weight freely hangs from the string, the valve is open.

In yet another aspect of the invention, there is disclosed a thermal water diverter, for diverting water from a hot-water supply pipe while, and only while, the temperature of water in the pipe is below a given value, the diverter being configured to be interjected into the pipe and comprising at least one thermally activated valve. Preferably the diverter further comprises, with respect to each of the valves, a valve actuator, which includes a container, in thermal contact with the water, a flexible enclosure, in fluid communication with the container, and a bi-phase fluid within the container and the flexible enclosure. Also preferably the number of thermally activated valves is one and it is a toggle valve, configured to assume two states; in a first state allowing water to flow from the hot-water pipe to an outlet device and in a second state allowing water to flow from the hot-water pipe to any other device.

In still another aspect of the invention, there is disclosed a flow duration limiter, for blocking the flow of a liquid along a pipe or out of the end of a pipe upon the elapse of a given period of time from the inception of such flow, configured to be interjected into the pipe or connected to the end of pipe and comprising a normally closed valve and a pressure sensitive actuator, attached to the valve and in fluid communication with the pipe. Preferably the actuator includes a closed chamber, divided by a flexible diaphragm into first and second compartments; the first compartment is in fluid communication with the pipe and the second compartment is in fluid communication solely with the first compartment through an essentially narrow orifice or conduit; the diaphragm is connected to the valve and cooperative therewith to keep the valve open as long as the pressure in the first compartment is greater than that in the second compartment and to let the valve close when the respective pressures in the two compartments are essentially equal. Also preferably the flow duration limiter further comprises a control conduit, a first end of which is connected to a pipe that carries a fluid at varying pressure, and means, connected to the second end of the control conduit and operative to drain liquid from the second compartment upon a rise of a given magnitude in the pressure of the fluid.

BRIEF DESCRIPTION OF THE DRAWINGS

The present invention, both as to its organization and manner of operation, together with further objects and advantages, may best be understood by way of example from the following description, taken in connection with the accompanying drawings, of which:

FIGS. 2B, 2C are schematic drawings, illustrating two states of water level in the tank of FIG. 2;

FIGS. 3A-3C are sectional drawings of certain parts of the diverter of FIG. 3;

BEST MODE FOR CARRYING OUT THE INVENTION

Figure 1:
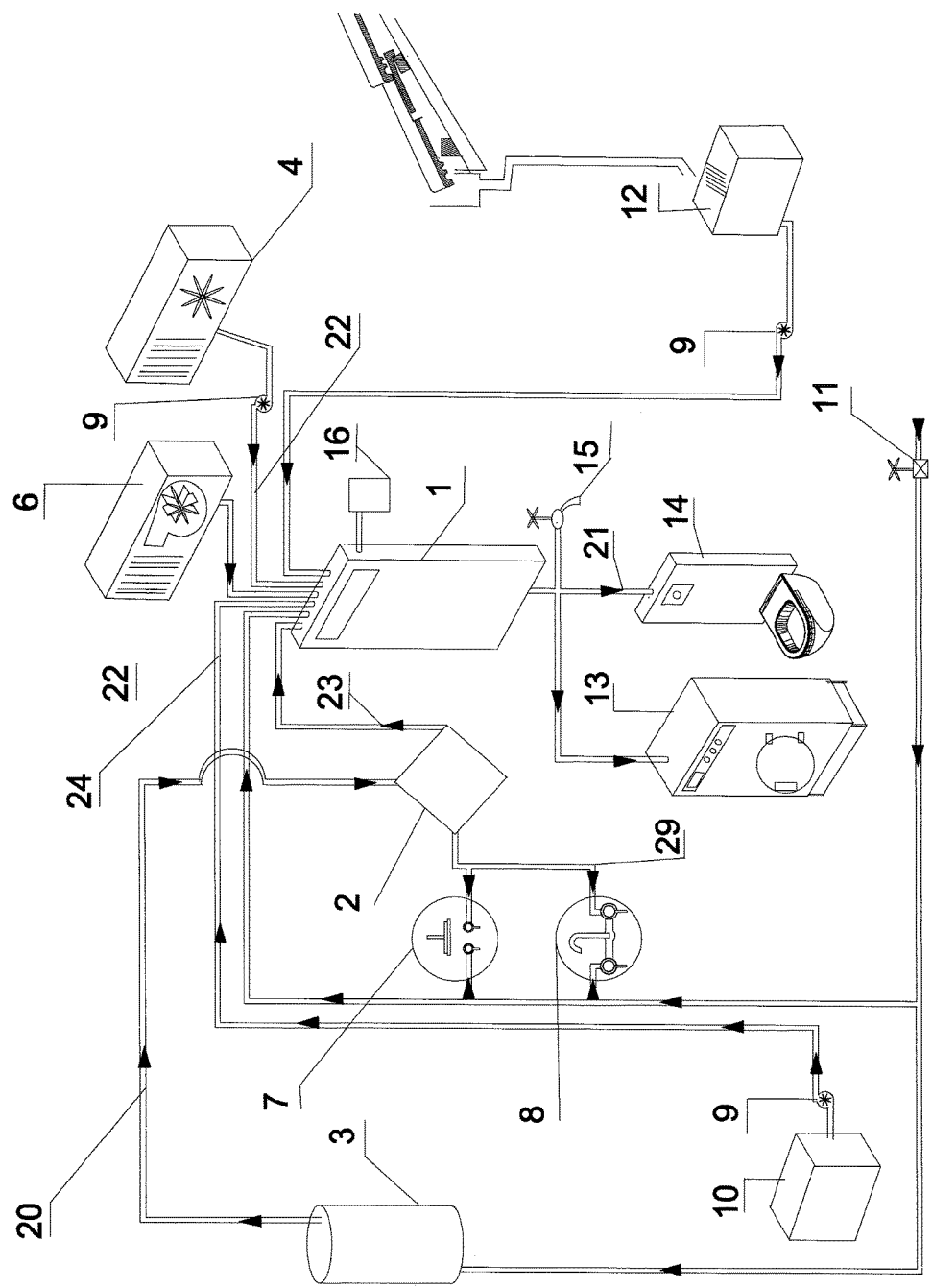
FIG. 1 is a schematic drawing of a typical configuration of an efficient water utilization system according to the present invention.

According to a preferred embodiment there is provided a system, a typical configuration of which is illustrated in FIG. 1, installable within a dwelling or any other building or any part thereof, for collecting and accumulating, in an accumulation tank (AT) 1, excess water from an outdoor unit 6 and an indoor unit 4 of an air-conditioner, and/or from hot-water pipes 20 and for delivering water, thus accumulated, to one or more toilet flushing tanks 14 and possibly to a washing machine 13 (collectively referred to as consumption devices). If and when available, excess water may also be collected from a rainwater collector 12 and/or from a waste-water treatment unit 10, possibly with the aid of pumps 9; unit 10, in turn, receives waste water through a drainage system from various sources within the building (not shown), such as bathtubs, shower- and wash basins and kitchen sinks. Accumulated water may also be deliverable to other consumption devices, such as a dedicated utility faucet 15.

In addition to excess water, from the various in-building sources, the system is also configured to let fresh water from the main supply system (also referred to as municipal system or water network) 11 to flow, through a pipe 24, supplementarily into the accumulation tank 1 whenever necessary in order to maintain a given minimum level, or quantity, of accumulated water, as further explained below. An outlet pipe or tube 21 is connected between an outlet port of the AT 1 and the inlet port of each toilet flushing tank 14, replacing the latter's connection to the main water supply system. It is noted that such an exclusive connection of the AT to each flushing tank (thus serving as its sole water supply) is advantageous, since it simplifies installation. Optionally, though, a supplementary fresh water supply arrangement may be provided at the inlet to the flushing tank, to be switched in instead of the outlet pipe—for example, in the case of malfunction of the AT or a maintenance operation thereon. The minimum quantity of water to be maintained in the AT is preferably defined as that required to fill a flushing tank once, as the AT is now its only source. This arrangement advantageously insures that excess water be used for flushing whenever possible and yet, if not enough excess water has been accumulated, that enough water be available (through the automatic supplementary feeding of fresh water into the AT) for the next flushing operation. It is noted that even when the level of water in the AT is less than the minimum defined above, any amount of water required by a flushing tank or any other consumption device can be automatically supplied from the AT, since fresh water may concurrently flow to it from the main supply system; in this case the AT serves, in effect, merely as a conduit. Similar exclusive connection may be provided also to any other consumption device to be supplied from the AT. The minimum quantity of water to be maintained in the AT may alternatively be defined to be relatively large, so as to serve as an emergency source in the case of temporary stoppage in the main water supply system; this possibility presents another advantageous use of the presently disclosed system.

Excess water from the air conditioner is produced as a condensate on the heat-exchanger (also known as the coil) of its evaporator, which is usually functional in its indoor unit 4 (for use during warm seasons) but (in certain models) may also be functional in its outdoor unit 6 (for use during cold seasons in certain regions of the world). The condensate usually drips to a collection pan (not shown) and thence it is fed, via a pipe 22, to the accumulation tank 1—either by gravity or with the aid of a pump 9 (shown here only in the path from the indoor unit). Clearly, in other configurations of the system, excess water from indoor- and outdoor units of additional air conditioners may be similarly feedable to the accumulation tank.

Figure 5:
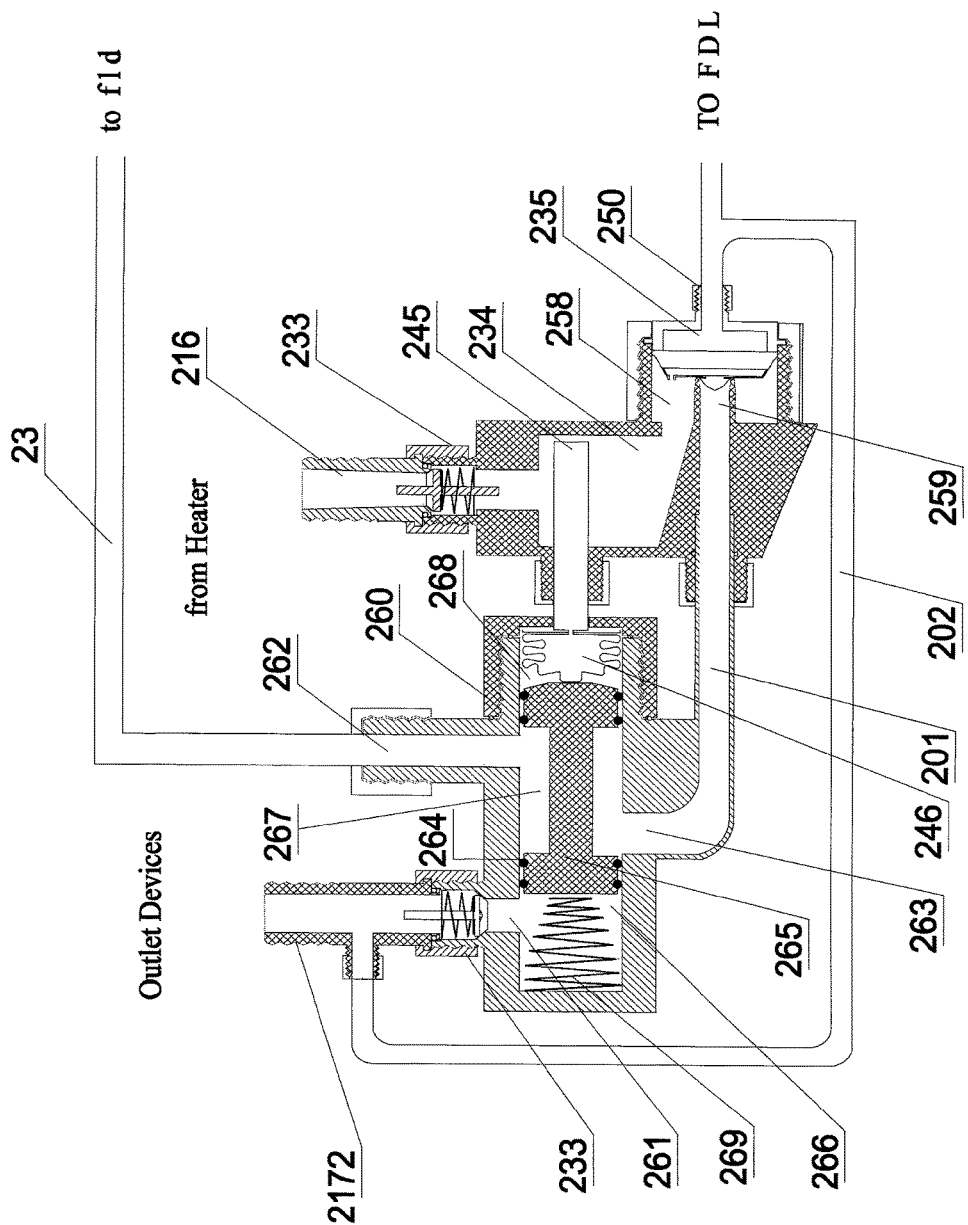
FIGS. 5A, 5B are sectional drawings of another configuration of the water diverter of FIG. 3, in respective states.
Figure 5:
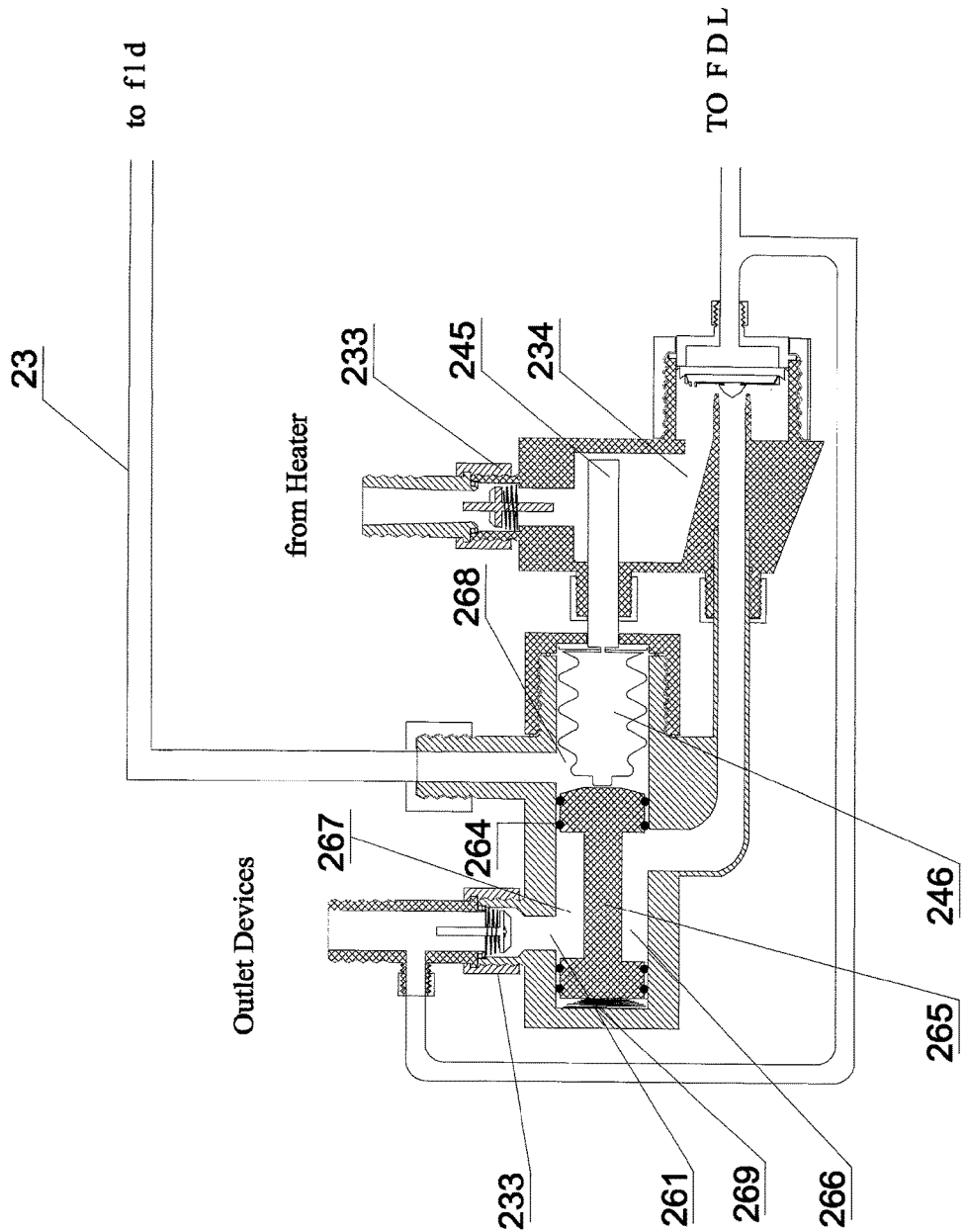

Hot water is typically supplied from a conventional water heater 3, which usually receives water from the main (e.g. municipal) water supply system, and fed, through so-called hot-water pipes 20, to various outlets within the building unit, such as a shower 7 and a wash- or kitchen faucet 8. The water heater may employ any known means for heating, including for example electric, solar or fuel-burning means According to the invention, there is provided a thermal water diverter (TWD) 2, interjected in a hot water pipe leading to one or more of the outlets. The TWD is generally configured so that when any of the outlets is open, the passage of water to the outlet is allowed only when the water is hot, but as long as the water is cool it is diverted to a pipe 23 leading to the accumulation tank 1. The structure and operation of the TWD is explained in detail below, in conjunction with FIGS. 3 and 5.

Optionally there is interjected in pipe 23, which conveys cool water from TWD 2 to AT 1, a Flow Duration Limiter (FDL) 16, to be described below with reference to FIG. 4. FDL 16 is a valve whose function is to block the flow of diverted cool water to the AT after the elapse of a given period of time. The value of that period is preferably set to be just slightly longer than the usual time of flow of water from heater 3, through hot-water supply pipe 20, to the outlet device. Alternatively, the blocking by the FDL of diverted water may be set to commence after the flow of a given amount of diverted water. The purpose of the FDL is to prevent an excessive amount of water (which is basically fresh water) from flowing into the AT in the case that no hot water is being supplied (owing, for example, to the heater not functioning or to the exhaustion of hot water supply). The FDL 16 is preferably located near the top of AT 1, allowing water accumulated in its measuring mechanism to be drained into the AT.

Figure 2:
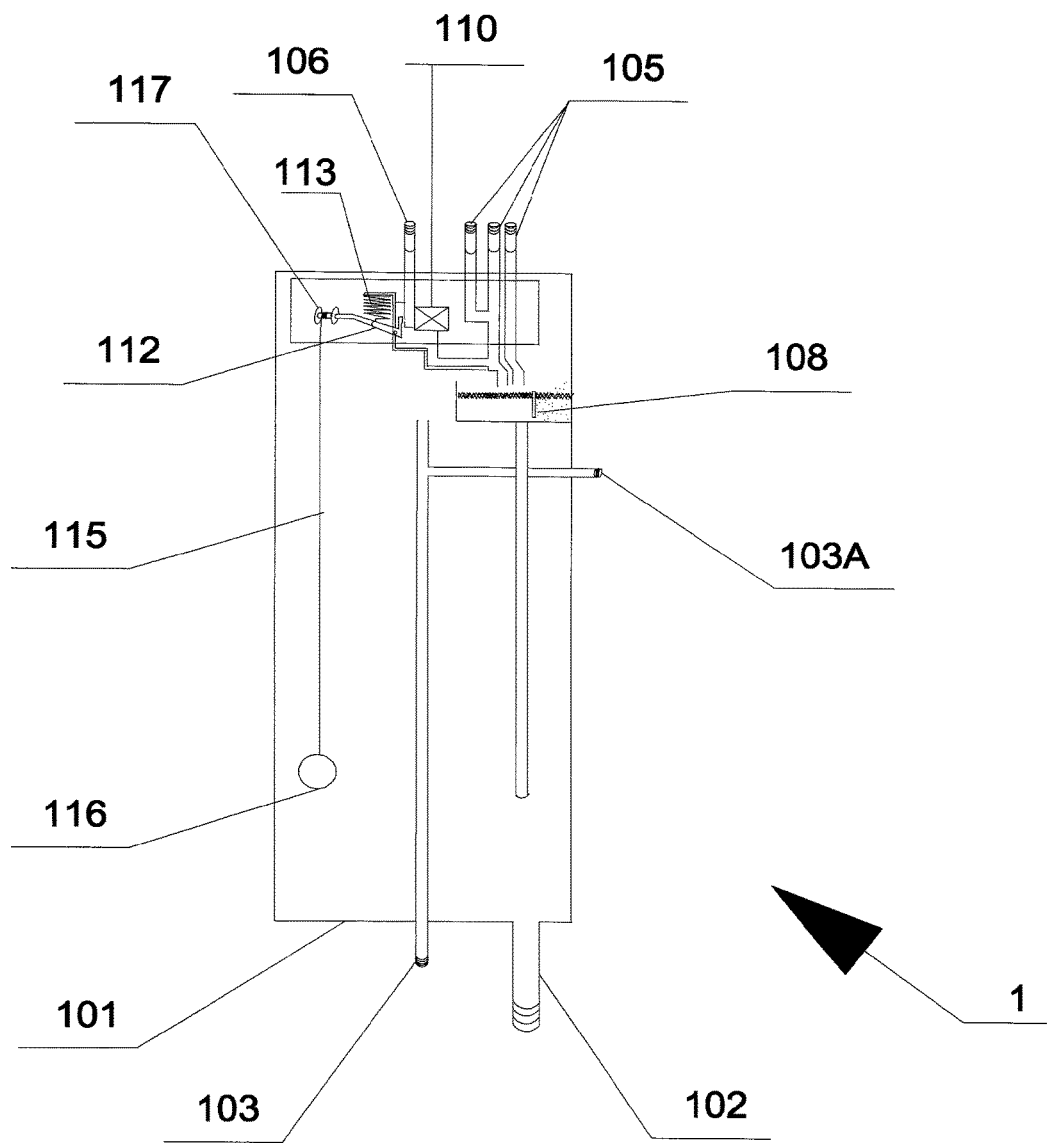
FIG. 2 is a sectional drawing of an accumulation tank, which is part of the system of FIG. 1.

Turning now to FIG. 2, there is shown the accumulation tank (AT) 1 (also referred to as a storage tank) in a longitudinal sectional view. The tank has preferably a rectangular shape—both longitudinally (i.e. in elevation view) and across (i.e. in plan view—not shown). Its depth dimension (normal to the drawing surface) is preferably small, compared to the other dimensions, so as to be mountable on, or inside, a building wall.

Typical dimensions are 60 cm in width, 100 cm in height and 15 cm in depth; larger dimensions may also be practical—allowing greater water accumulation capacity. The wall of the tank, as well as its top and bottom plates, may be made of any appropriate sturdy and resilient material, including metal, ceramic or polymer materials.

The bottom plate 101 of the AT is configured with one or more outlet ports 102, which are connected to respective outlet pipes, each leading to one or more consumption devices—toilet flushing tank 14 and washing machine 13 in the configuration of FIG. 1. The flow of water from the outlet ports to the consumption devices is preferably by gravity, the AT being installed at sufficient height above them, but the use of a pump (not shown) is also possible. The flow of the water is preferably controlled by the inlet valve of each consumption device, so that no control valves are required at the outlet ports of the AT. In addition, there is provided inside AT 1 an overflow tube 103, which is a vertical tube, whose upper, open, end is located near the top of the tank (i.e. at the desired maximum water level) and whose lower end protrudes through the bottom plate of the AT and is connected to a pipe or tube that leads to a drainage facility, such as the building's drainage system, or to a sink or a toilet or directly to inside a toilet flushing tank (which itself is usually provided with an overflow arrangement). Alternatively, the overflow pipe may be configured to protrude through a wall, as for example pipe 103A. Thus, when water is accumulated in the AT to the maximum desired level, any further inflow of excess water is automatically diverted to the overflow tube and drained away.

Figure 2A:
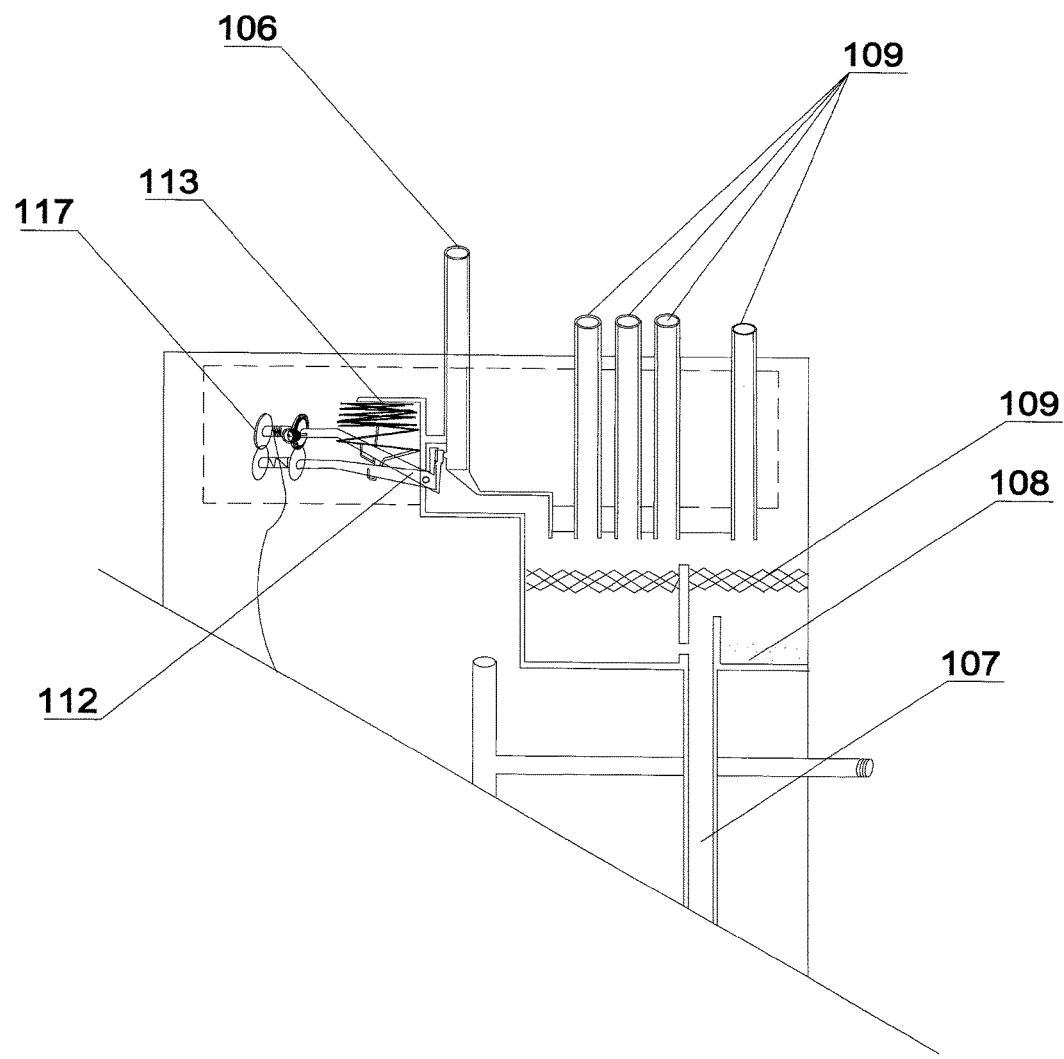
FIG. 2A shows in detail the upper portion of the tank of FIG. 2.
Figure 2:
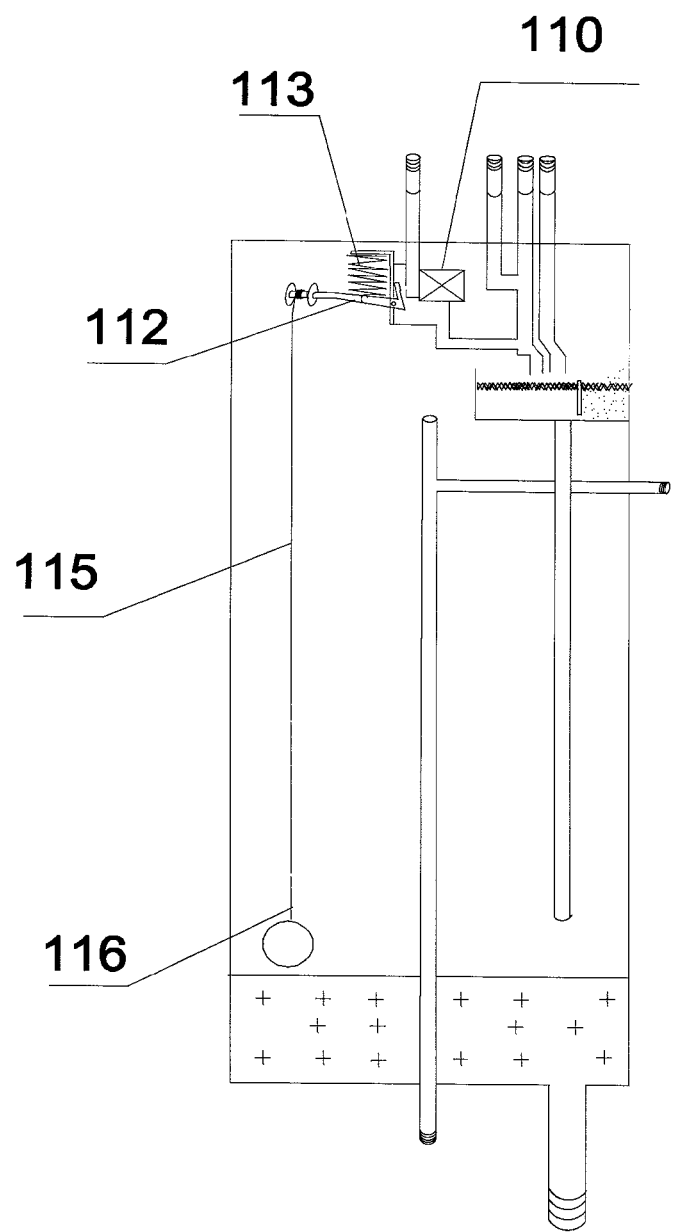

As seen in FIG. 2 and, in greater detail, in FIG. 2A, the top plate 104 of the AT is configured with one or more inlet ports 105, which are connected to respective inlet pipes, each conveying excess water from one or more sources—air conditioner evaporator coils 4 and 6 and hot water diverter 2 in the configuration of FIG. 1, as described above. The top plate 104 is preferably also configured with a service port, covered by a removable lid (both not shown), making the inside of the tank and its components reachable for cleaning, servicing and for possibly replacing components. It should be understood that in other configurations of the AT, the service port and/or any of the inlet ports, may also be located at a wall of the AT, preferably a front wall, near its top.

Directly under some or all of the inlet ports 105 there is preferably disposed a drip pan 108, configured to collect water dropping from the inlets (which may often appear as individual drops) and to let it flow quietly into the accumulated water in the tank. The drip pan may, for example be provided with an open vertical tube 107 that reaches to near the bottom of the tank, through which water, collected in the pan, flows down to the current accumulation level. Preferably the drip pan 108 also includes a filter 109, configured to collect particulate matter that arrives with inflowing excess water, thus removing such matter from water accumulating in the tank.

Figure 2C:
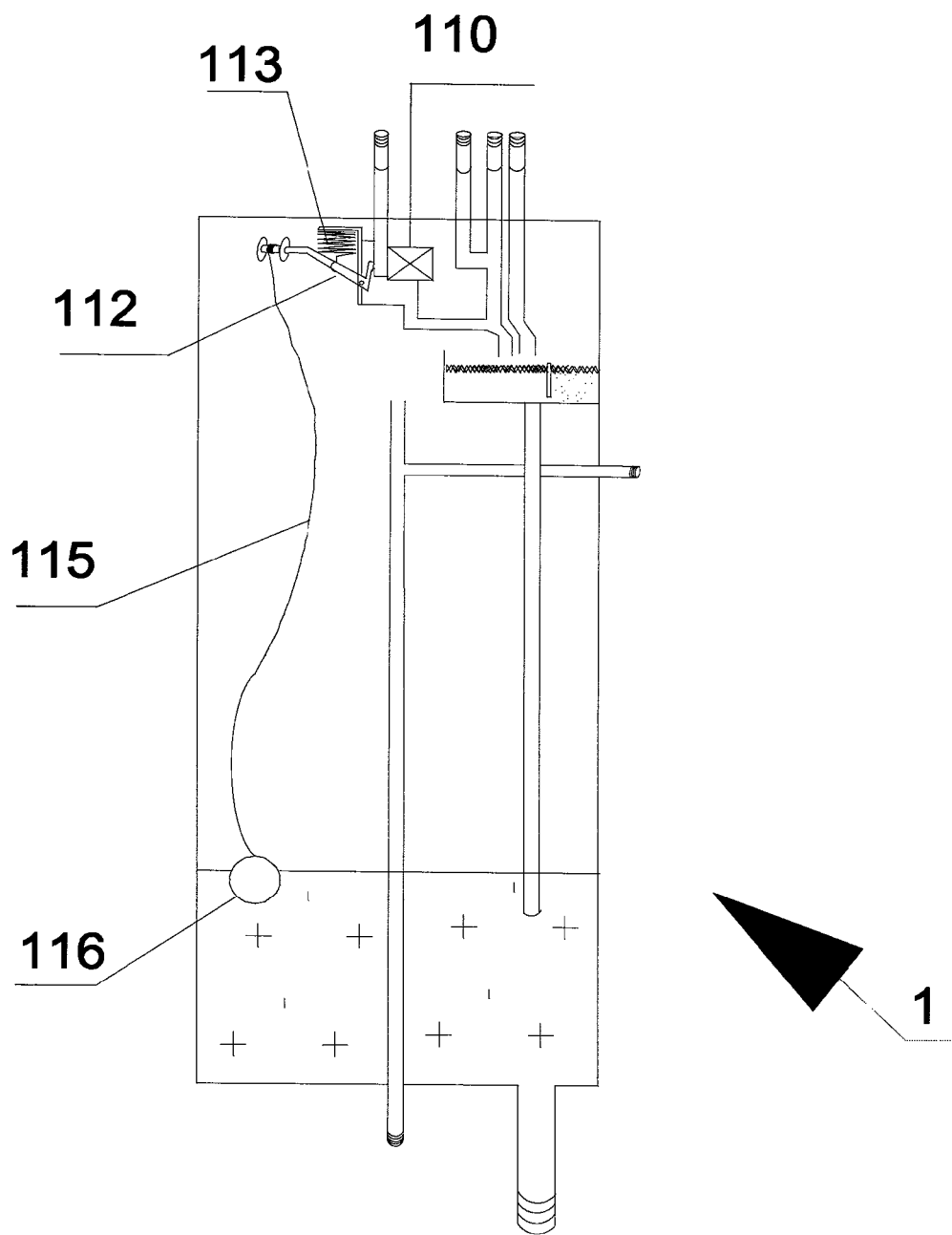

An additional inlet port 106 in the top plate 104 (or alternatively in the side wall) of the AT is connected by pipe 104 (FIG. 1) to the main water supply system. Inside the tank it is connected, by a short tube, to an inlet valve 110. The valve is configured to be normally closed, so as to block passage of fresh water into the tank, but operative to open by the action of a lever 112 so as to let fresh water in. To the lever 112 is attached a tension spring 113 (or alternatively a compression spring), configured to pull (or respectively push) the lever so as to keep valve 110 closed. Also attached to lever 112 (preferably in a manner to be discussed below) is one end of a string (or flexible wire) 115; the other end of the string is attached to a floating weight 116. The latter is designed to be sufficiently heavy so that when it hangs freely from the string 115, the lever 112 is pulled, against the action of spring 113, to open the valve 110. Yet the floating weight 116 is also designed with sufficient volume to float on water, so as to keep the string 115 loose. The length of the string is determined to be such that as long as the water level in the AT is above a given minimum height from the bottom (which defines a minimum volume of accumulated water), the floating weight 116 floats at that level and does not pull the string—as seen in the illustration of FIG. 2B; under such circumstances, lever 112 is not pulled and fresh-water inlet valve 110 remains closed (by the action of spring 113 on lever 112). If, however, the water level sinks below the given height, as illustrated in FIG. 2C, the floating weight becomes retained by the string, pulling it and thereby—also the lever 112; this causes valve 110 to open and to let fresh water flow through inlet 106 to the AT. The flow of fresh water continues until the water level reaches the given height, at which time the pull on the string, by the floating weight, slackens and the valve closes, as described above.

The length of the string 115 is adjustable (to correspond to any given minimum height of the water level)—preferably as shown in FIG. 2A. Here a bobbin 117 is attached to the end of the lever 112 in a manner that makes it rotatable against frictional resistance but otherwise remaining in fixed orientation. The upper portion of the string is wound a few windings around the bobbin and its end fixedly attached thereto. Turning the bobbin increases or decreases the length of the wound portion of the string and thus decreases or increases, respectively, the length of the portion attached to the floating weight, which, in turn, causes the latter, when not floating, to hang at higher or lower position, respectively.

It is noted that also other means for controlling the flow of fresh water into the AT according to the level of the accumulated water may be employed—all being within the scope of the system of the present invention. For example, the valve may be a normally open valve and is held closed by the lever being pushed, through a rod, by a (non-weighted) float. However, the means described above with reference to FIGS. 2A-2C are deemed advantageous, since they are simpler and amenable to relatively easy servicing through the service port at the top of the tank.

Figure 3:
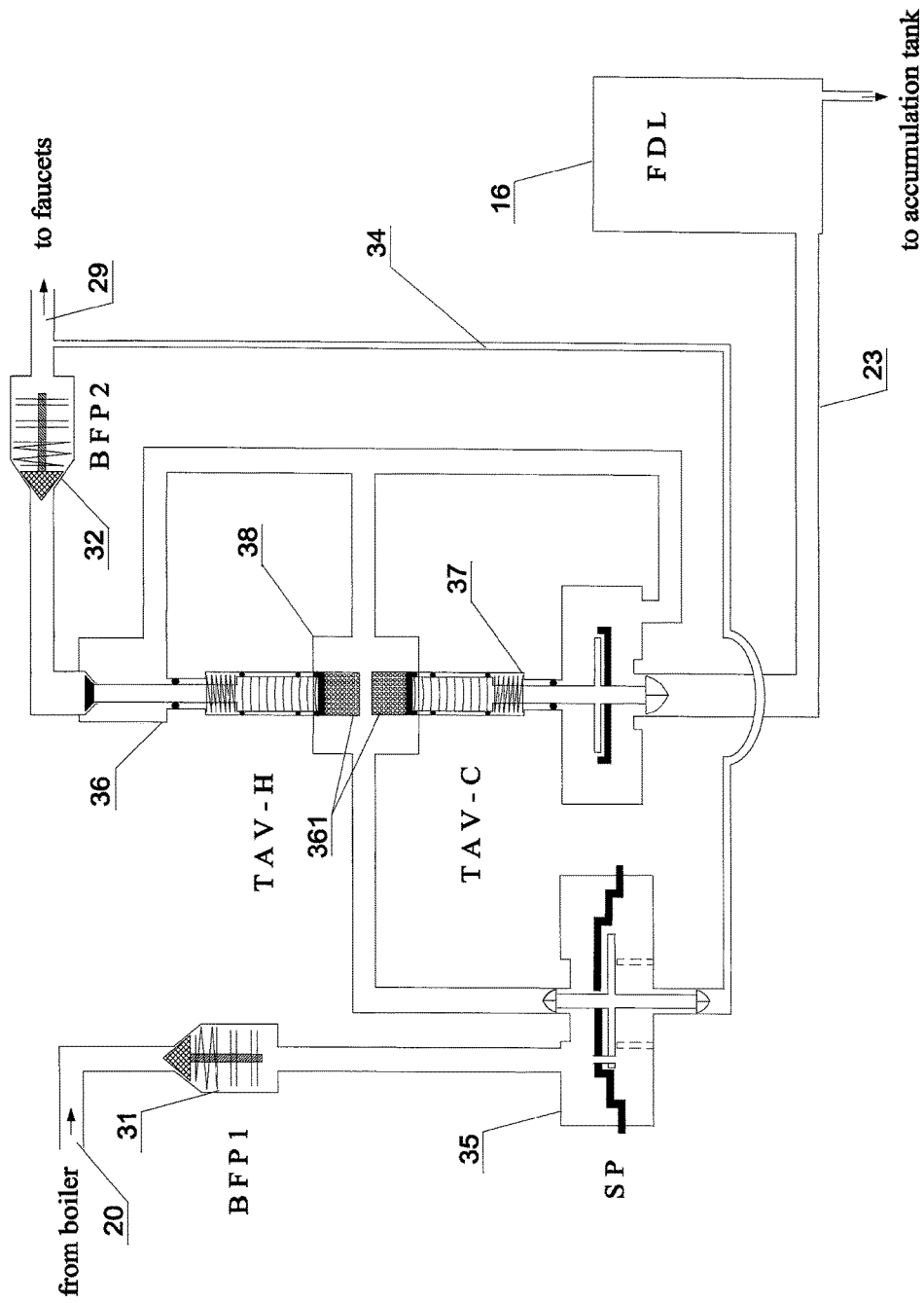
FIG. 3 is a schematic drawing of a thermal water diverter, which is part of the system of FIG. 1.
Figure 3:
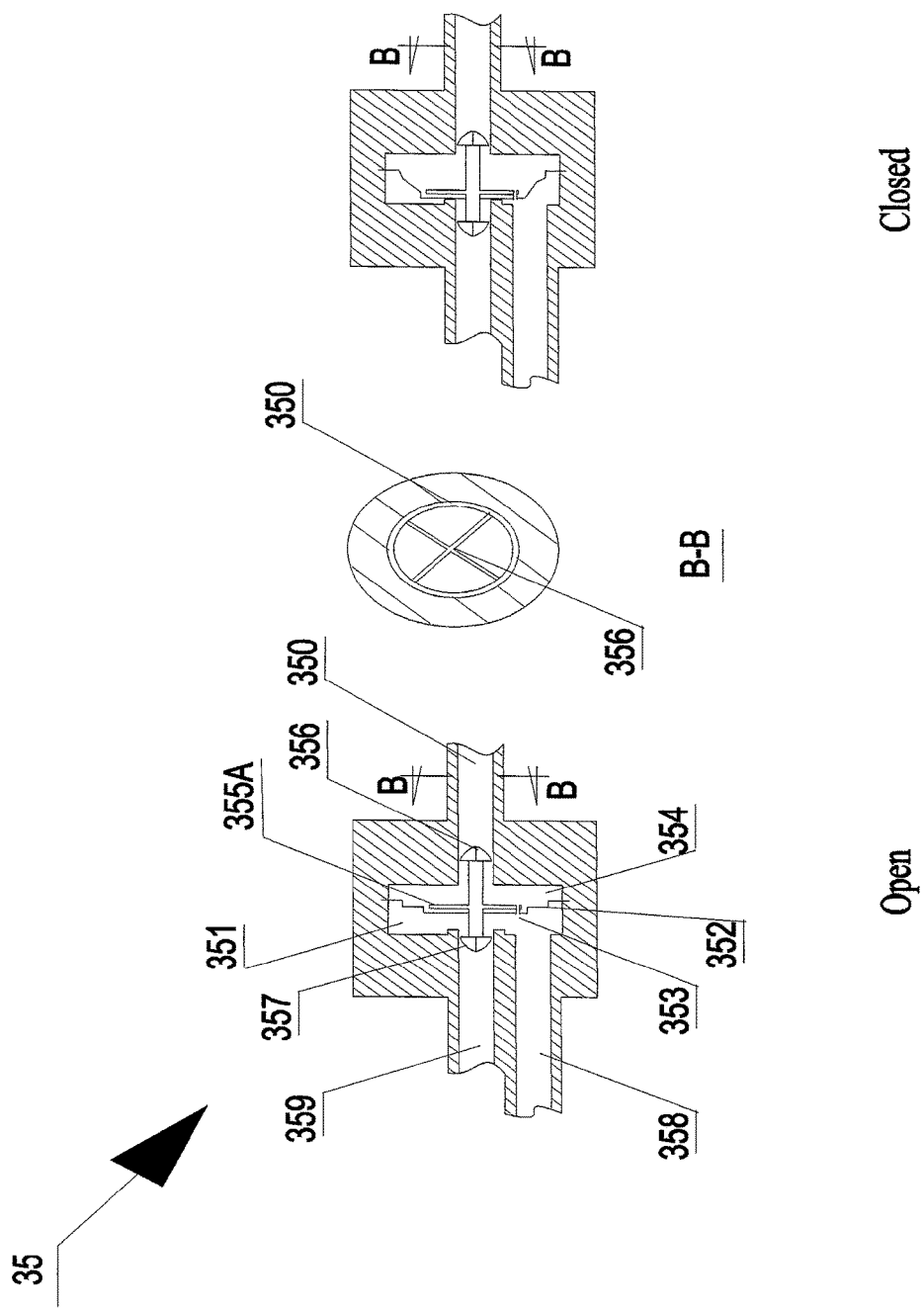
Figure 3:
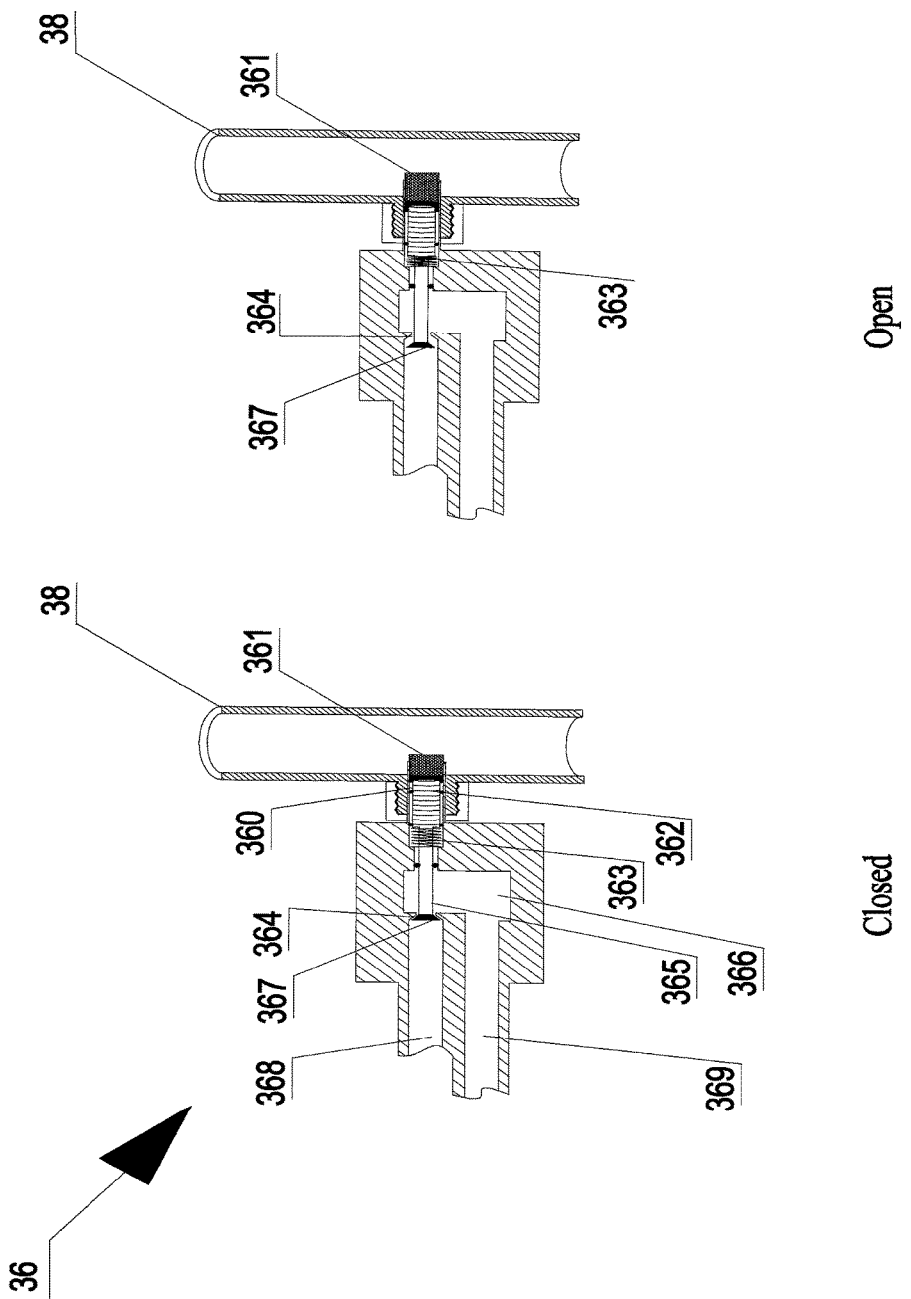
Figure 3:
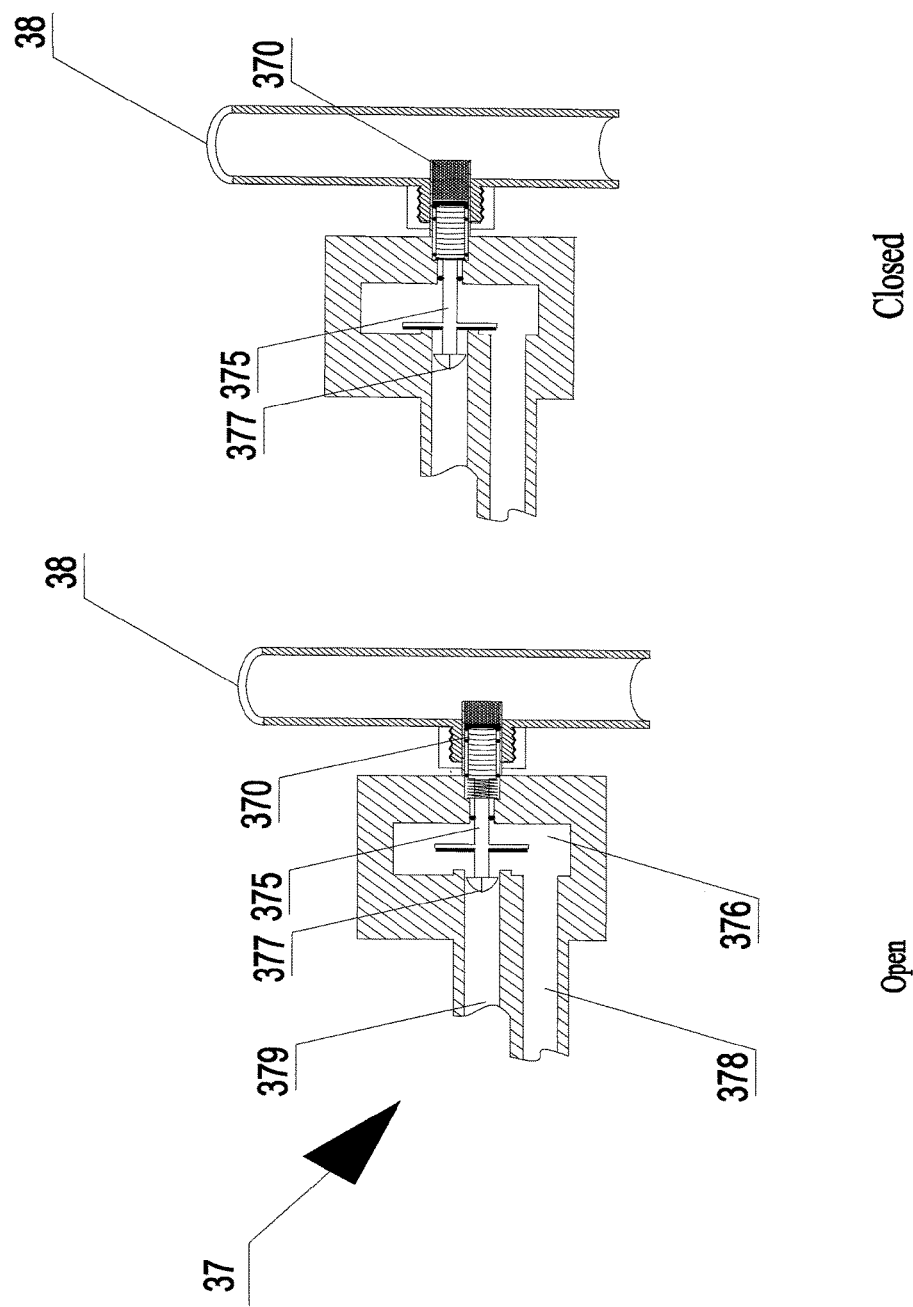

Turning now to FIG. 3, there is shown a schematic drawing of one configuration of a thermal water diverter (TWD) 2, which, as noted above, is generally interjected in a hot-water pipe that leads to one or more outlet devices and serves to divert the water, while cool, to the accumulation tank. In the configuration of FIG. 1, water arriving from the heater 3 through hot-water supply pipe 20 flows, when hot, from the diverter through delivery pipe 29 (which leads to the outlet devices), as is normal. While the incoming water is cool (as is usually the case when an outlet device is first opened after a relatively long period of no flow), it exits via excess water pipe 23 (which leads, through FDL 16, to AT 1).

The TWD of FIG. 3 is configured as follows and is described in further detail with reference to FIGS. 3A-3C. Arriving water first passes preferably through a first Back-Flow Preventer (BFP) 31 (formerly referred to as BWP), which is a passive valve that prevents water from flowing back into pipe 20. The water then passes through a pressure-actuated valve (PAV) 35 (formerly referred to as SP), which is a valve that is actuated by the pressure of water applied to it through a pressure conduit 34, connected to delivery pipe 29. PAV 35 is normally closed, preventing flow of water therethrough.

However, when the water pressure within outlet pipe 29 decreases, owing to the opening of a faucet (or any other outlet device) connected to it, the resulting reduced pressure in pressure conduit 34 causes the valve in PAV 35 to open, thus allowing water flow; when the faucet is closed, normal pressure returns to outlet pipe 29 and pressure conduit 34, causing the valve in PAV 35 to close and thus stopping the water flow therethrough.

Water passing through PAV 35 (when open) may flow through an enclosure 38 (to be explained below) and continue in any of two paths—one through a hot-open thermally-actuated valve (TAV-H) 36 (formerly referred to as THO) and the other through a cold-open thermally-actuated valve (TAV-C) 37 (formerly referred to as TCO); TAV-H opens when the entering water is hot and closes when the water is cool, while TAV-C opens when the entering water is cool and closes when the water is hot. "hot" refers to temperatures that are equal to, or above, what is typically considered to be that of useable or acceptable hot water, while the term "cool" refers to temperatures below that level. Thus, as long as the water arriving through pipe 28 and flowing through PAV 35 is hot, the valve TAV-H 36 is open and the water flows on, through a second Back-Flow Preventer (BFP) 32, to the outlet pipe 29 and thence to the currently open faucet. If, however, the arriving water is cool or cold (which usually occurs upon the initial opening of a faucet after a relatively long period of non-use) and as long as it remains cool, the valve TAV-H is closed, while the valve TAV-C 37 is open and the water flows through it and then on, through diversion pipe 23 and FDL 16, to a corresponding inlet port in AT 1 (FIG. 1). Both BFPs, 31 and 32, are commercially available components. As noted above, the FDL 16 is a valve that limits the amount of water that may flow through it; once a given amount has passed through, it closes and no more water may pass.

As will be explained below, each of the two thermally-actuated valves (TAVs) includes a container 361, which preferably contains a bi-phase fluid. Each TAV is configured so that its container 361 protrudes into enclosure 38 and is in thermal contact with any water flowing therethrough. In other configurations of the TWD, there may be two separate enclosures, similar to 38, one for each TAV.

Optionally a bypass conduit (not shown) is provided, connecting between hot-water supply pipe 20 and delivery pipe 29 and including a manually operated valve. It is to serve for supplying water from the water heater directly to the outlet devices in the case that its temperature remains below that it which the TAV-H 36 would open, but the user wants to use the water anyway.

Turning now to FIGS. 3A to 3C, there are shown sectional views of the components PAV, TAV-H and TAV-C, respectively, of the water diverter of FIG. 3. FIG. 3A shows, in longitudinal- and cross-sections, an embodiment of the pressure-actuated valve (PAV) 35; the longitudinal section appears twice—the left one showing an open state and the right one showing a closed state. A chamber 351 is divided by a flexible diaphragm 352 into two mutually isolated compartment—a left-hand compartment 353 and a right-hand compartment 354. The left-hand compartment 353 is in fluid communication with inlet port 358 (which is connected to the first BFP 31) and with cylindrically hollow outlet port 359 (which is connected to the conduit leading to TAV-H and TAV-C, as seen in FIG. 3). The right-hand compartment 354 is in fluid communication with cylindrically hollow control port 350, which is connected to conduit 34 (FIG. 3). A plunger 355 is attached concentrically to diaphragm 352, by means of flange 355A, and protrudes therefrom normally into both compartments 353 and 354. The ends of plunger 355 are provided with sliding guides 356 and 357, configured to slide along, and concentrically with, control port 350 and outlet port 359, respectively. A cross-sectional view of guide 356 is shown (not to scale) in section B-B; the shape of guide 357 is similar. The center of the diaphragm 352 is thus configured to move axially with the plunger. The diaphragm is formed and placed so that in its natural, unflexed, state it presses against the end of outlet port 359 (as seen in the left-hand drawing), thus blocking passage of water therethrough. Preferably the end of outlet port is provided with a gasket, to improve such blocking action.

Operation of the PAV 35 is as follows: When all device outlets (also referred to as faucets, and formerly—as external taps) connected to delivery pipe 29 (FIG. 3) are closed, the pressure therein is equal to that of the main water supply system, which pressure is transmitted through conduit 34 and control port 350 to the right-hand compartment 354. This pressure, exerted on diaphragm 352 from the right, exactly balances the pressure in the left-hand compartment 353, pressing against the diaphragm from the left, thus letting the diaphragm assume its natural unflexed form, pressing against the end of outlet port 359 and blocking it. When, however, any of the outlets connected to delivery pipe 29 is opened, the pressure in the pipe lessens. The lessened pressure is, again, transmitted through conduit 34 and control port 350 to the right-hand compartment 354. As a result, there is a net pressure exerted by the water in the left-hand compartment 353 on diaphragm 352, which forces it to move (with the attached plunger 355) to the right, thus opening the entrance to outlet port 359 and allowing water to flow therethrough. This situation remains until all the device outlets are closed again, at which point the pressure in the right-hand compartment returns to its full value and the diaphragm is free to assume its natural state, again blocking the passage of water through the PAV. It is noted that, when the diaphragm blocks the entrance to the outlet port, natural drainage of water from the latter reduces the pressure therein, thus allowing the full pressure prevailing in compartment 354 and acting on the diaphragm to tighten the blocking effect.

FIG. 3B shows an embodiment of the hot-open thermally-activated valve (TAV-H) 36—in two drawings, the left-hand drawing showing the closed state and the right-hand drawing showing the open state. A chamber 366 is in fluid communication with a cylindrically hollow outlet port 369 (when in open state) and with an inlet port 368. Outlet port 369 ends with a ring-like socket 364 with a conical surface. A thermal actuator 360 is located coaxially with outlet port 369 and includes a container 361 and an expandable enclosure 362, in fluid communication with the container. The latter two components in common preferably contain a bi-phase fluid—such that is gaseous at the temperature of hot water (as defined above) and liquid at the temperature of cool water (as defined above). Container 361 is in thermal contact with water that flows through enclosure 38 (FIG. 3). Expandable enclosure 362 is bound on the left by a compressible spring 363 and is attached to a plunger 365. The latter extends, across chamber 366 and through socket 364, into outlet port 369 and to its end is attached a conical plug 367, whose conical surface matches that of socket 364.

Operation of TAV-H 36 is as follows: When the temperature of the water flowing through enclosure 38 is cool, the bi-phase fluid is in liquid state, allowing enclosure 362 to be in contraction by the action of spring 363. This causes plunger 365 to be at its rightmost position, whereby plug 367 is in tight contact with socket 364, thereby blocking passage of water from inlet port 368 to chamber 366 and thence to the outlet port. When, however, the water flowing through enclosure 38 is hot, some of the bi-phase fluid evaporates, thus turning into gas, which produces pressure that causes enclosure 362 to expand, pushing against spring 363. This expansion causes plunger 365 and plug 367 to move left, thereby opening a gap between the plug and socket 364, which allows water to flow from inlet port 368 to chamber 366 and thence to outlet port 369.

FIG. 3C shows an embodiment of the cold-open thermally-actuated valve (TAV-C) 37—again in two drawings, the left-hand drawing showing the open state and the right-hand drawing showing the closed state. A chamber 376 is in fluid communication with a cylindrically hollow outlet port 379 (when in open state) and with an inlet port 378. A thermal actuator 370, similar to the actuator 360 of the TAV-H (FIG. 3B), is located coaxially with outlet port 379. To the end of the expandable enclosure in actuator 370 is attached a plunger 375, which extends coaxially across chamber 376 into outlet port 379. The end of plunger 375 is provided with a sliding guide 377, configured to slide along, and concentrically with, outlet port 379. To plunger 375 is also concentrically attached a disc 378, located and configured so that when the plunger is pushed leftward, the disc closes the end of outlet port 379 so as to prevent flow of water therethrough. The container of thermal actuator 370 protrudes into enclosure 38 and is in thermal contact with water flowing therethrough, as explained with reference to FIG. 3. Operation of TAV-C 37 is as follows: When the temperature of the water flowing through enclosure 38 is cool, the bi-phase fluid is in liquid state, allowing the expandable enclosure of actuator 370 to be in contraction by the action of a spring. This causes plunger 375 to be at its rightmost position, whereby disk 378 is remote from the opening of the outlet port, allowing water to freely flow through. When, however, the water flowing through enclosure 38 is hot, some of the bi-phase fluid evaporates, thus turning into gas, which produces pressure that causes the expandable enclosure to expand. This, in turn, causes the plunger 375, together with the disc 378, to move leftward, causing the disc to press against the end of outlet port 379 and to thus block the flow of water from inlet port 378 through chamber 376 to the outlet port.

Figure 4:
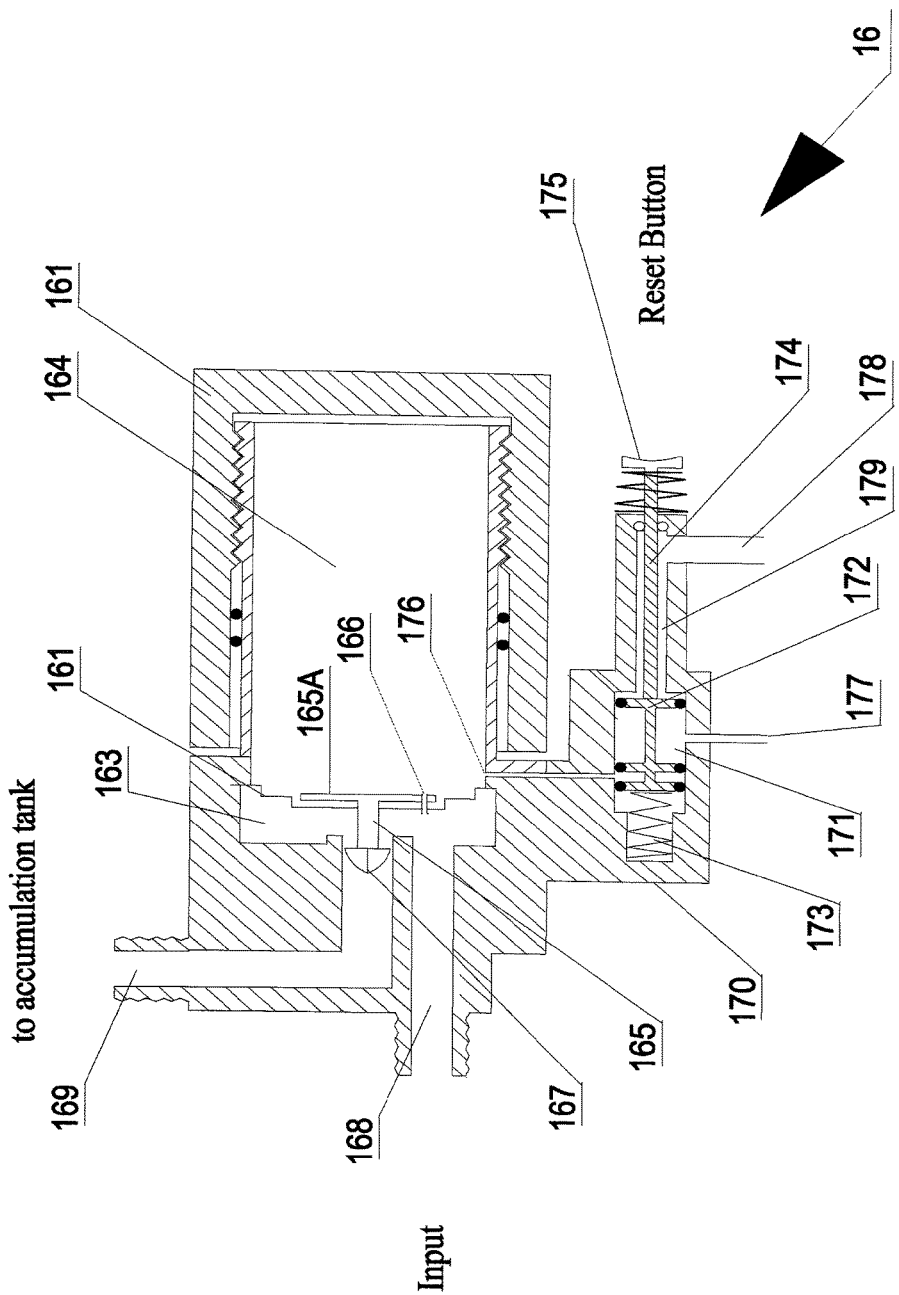
FIG. 4 is a schematic drawing of a flow duration limiter, which is an optional part of the system of FIG. 1.

Turning now to FIG. 4, there is shown an embodiment of the Flow Duration Limiter (FDL) 16 (formerly referred to as TIC). The FDL is basically a time-delay valve that normally lets diverted excess (cool) water flow from the Thermal Water Diverter 2 to the AT; but in the case that the duration of such flow exceeds a given value, the flow is blocked, to prevent waste. The FDL is formed to include an inlet port 168, a cylindrical outlet port 169 and, coaxial therewith, a cylindrical chamber that is divided by a flexible diaphragm 162 into two compartments. Inlet port 168 is connected by a pipe The left-hand compartment 163 is generally in fluid contact with the inlet port 168 and the outlet port, the latter being directly connected to a pipe that leads to the AT 1 (FIG. 1). The right-hand compartment 164 of the chamber is in fluid contact, through a narrow orifice 166, preferably across diaphragm 162, with the left-hand compartment 163. Right-hand compartment 164 is bounded on the right by a cap 161, which is attached to the outside surface of the body of the FDL through a threading and sealing rings; rotating cap 161 along its threading causes the volume of the compartment to increase or decrease. The center of diaphragm 162 is fixedly attached to a plunger 165, by means of flange 165A, and protrudes therefrom normally, through the left-hand compartment 163, into outlet port 169, along which a sliding guide 167, attached to the end of plunger 165, is configured to be slidable. Diaphragm 162 is configured so that when it is pushed leftward against a the rim surrounding the end of outlet port 169, it blocks any flow through that port.

FDL 16 is further formed to include a drainage appendix 170. This includes a cylindrical chamber 171, along which a three-ringed piston 172 may slide. Piston 172 is normally held at its rightmost position by the action of a compressible spring 173. Chamber 171 is in fluid communication with right-hand compartment 164, through a narrow conduit 176, and with a drain outlet 177. Chamber 171 is also in fluid communication with a narrower cylindrical extension 179, which, in turn, is in fluid communication with control port 178. The latter is connectable, through a narrow control pipe 30, to delivery pipe 29 (FIG. 3). A rod 174 extends from piston 171 coaxially along extension 179 and ends with a pushbutton 175.

The FDL operates as follows: When cool water is first diverted from the TWD 2 (which usually occurs only when an outlet device has been opened), it flows through pipe 23, inlet port 28, left-hand compartment 163 and outlet port 169 on to the AT; right-hand compartment 164 is then empty and diaphragm 162 is in its normal state—not blocking outlet port 169. Some of the water in left-hand compartment 163 flows through orifice 166 into the right-hand compartment 164, slowly filling it. The rate of flow is determined by the resistance of the orifice, which is a function of its dimensions When the right-hand compartment becomes full, the pressure therein rises and pushes the diaphragm 162 leftward until it contacts the rim at the end of outlet port 169, thereby blocking it and thus preventing any further flow into the AT.

In order for the FDL to enable flow again, it must be reset, by draining the water out of the right-hand compartment, thus relieving the pressure therein and releasing the diaphragm from blocking the passage; this is done by means of the drainage appendix 170. In its normal position, piston 171 blocks any passage of water from conduit 176, through chamber 171, to drain outlet 177. When manual resetting is desired, button 175 may be pushed, thereby moving the piston leftward and thus opening a passageway from conduit 176 to drain port 177—allowing drainage of the water in the right-hand compartment. Preferably, the resetting and drainage operation is done automatically, as follows: When an open outlet device is closed, the water pressure in the pipe 29 that leads to it rises. This pressure is conveyed through control port 178 to and thence to chamber 171. There the pressure acts on piston 172 and pushes it leftward, achieving the same effect of pushing button 175, described above.

Because of the need for drainage, as described above, the FDL 16 is preferably installed above, or at the top inside, the accumulation tank 1. Such an arrangement advantageously avoids the necessity to install a pipe between the FDL and the AT and also allows the FDL to be fed from a plurality of TWDs. Another possible arrangement is to package the FDL with a TWD, which has the advantage of avoiding the necessity to install a water flow pipe between the TWD and the FDL and a control pipe between the delivery pipe 29 and the control port 178 (which would then be directly connected to conduit 34 in the TWD). Yet another possible arrangement is to install the FDL at any other convenient location. The latter two arrangements require provision of a conduit from the drain port 177 to a suitable drainage facility, such as a sink or a toilet flush tank.

It is noted that a novel flow duration limiter, as described hereabove, may be applicable also to other systems and to other types of liquids.

Turning now to FIGS. 5A and 5B, there is shown, in sectional view, another configuration of the thermal water diverter 2. It is functionally similar to the configuration of FIG. 3, but advantageously differs from it in two aspects: It is constructed as a single assembly, which is simpler to install, and the two thermal valves have been combined into a single thermal toggle valve. The advantages of a single toggle valve over a pair of simple valves are that it is cheaper to manufacture, since it includes only one heat sensing part, and that the diversion of water between the two outlet is coordinated (in contrast to the mutual independence of the two thermal valves in FIG. 3). FIG. 5A shows the diverter in the normal state, in which (hot) water flows to the outlets, while FIG. 5B shows it in the diverting state, in which (cool) water flows to the accumulation tank.

Water from the heating system can enter the TWD through inlet connector 216, which is connected to the hot-water supply pipe 28 (leading from the heater 3 in the configuration of FIG. 1), and pass first through a first backflow preventer 233 and thence to a chamber 234. Within chamber 234 there is disposed a hollow cylinder 245, in thermal contact with the water in the chamber; its function is described below. The chamber 234 is in fluid contact with the inlet port 258 of a pressure-actuated valve (PAV) 235 and when the latter is open, water can flow through the PAV and its outlet port 259 on to an intermediate conduit 201. PAV 235 is preferably constructed and operative similarly to PAV 35 in the TWD of FIG. 3, as described above with reference to FIG. 3A. Its control port 250 is fluidly connected through a control conduit 202 to outlet connector 217 (see below) and thus also to delivery pipe 29 (FIG. 1).

The intermediate conduit 201 leads to, and is in fluid contact with, the inlet port 263 of thermal toggle valve 260. The latter has two outlet ports: A first outlet port 261 is connected, through a second backflow preventer 233, to an outlet connector 217, which, in turn, is connectable to delivery pipe 29 (which leads to one or more outlet devices). A second outlet port 262 is connected to pipe 23 that leads to the FDL 16. In some configurations of the TWD a flow duration limiter (FDL) may be attached to, or packaged with, the TWD; in such a configuration, the second outlet port 262 is connected directly to the inlet port of the FDL.

Toggle valve 260 is formed to have a cylindrical chamber 264, in fluid contact with inlet port 263 and with outlet ports 261 and 262. Within the chamber . . . there is a shuttling piston 265, configured to divide the chamber into three spaces—left-hand space 266, middle space 267 and right-hand space 268—and to provide fluid isolation between them. The piston is movable axially, thereby varying the length of the two end spaces. When the piston is in its leftmost position, as depicted in FIG. 5A, the middle space 267 is in fluid contact with both the inlet port 263 and the first outlet port 261, thereby enabling flow of water from the intermediate conduit 201 to outlet connector 217 (and thence—through pipe 29 to the outlet devices). When the piston is in its rightmost position, as depicted in FIG. 5B, the middle space 267 is in fluid contact with both the inlet port 263 and the second outlet port 262, thereby enabling flow of water from intermediate conduit 201 to pipe 23 (and thence—to the AT). The left-hand space 266 is provided with a compressible spring 269, configured to push the piston to the right. The right-hand space 268 is provided with a flexible enclosure 246, the interior of which is in fluid contact with the interior of hollow cylinder 145. The latter is filled preferably with a bi-phase fluid (or alternatively with a thermally expandable gas), such that is in liquid state at a temperature near that of cool water and in gaseous state—at a temperature near that of hot water.

Operation of this assembly is as follows: As long as hot water flows through chamber 234, hollow cylinder 145 is kept at an elevated temperature and thus the fluid therein is in gaseous state, filling also the flexible enclosure 146 and creating therein enough pressure to cause it to push the piston 265 to the left, compressing spring 269—thereby directing water to the outlet devices, as described above. If, however the water flowing through chamber 234 is cool (as is usually the case when an outlet device is opened after long disuse), the fluid in the cylinder reverts to liquid state, reducing any pressure in the remaining gas in the flexible enclosure 246, thus enabling the spring 269 to push the piston to the right (while exhausting the gas from the flexible enclosure into the cylinder), thereby diverting water to the accumulation tank, as described above. It is noted that when none of the outlet devices is open, flow of water through PAV 235, and therefore also through the entire TWD, is blocked.

Clearly, other configurations and embodiments of thermal water diverter 2 are possible—all coming within the scope of the present invention. In particular, some or all of the components of such a diverter may be realized or supplemented with electrical sensors and actuators; the purely mechanical means, such as employed in the configurations described above, are however deemed advantageous, since they are generally more reliable and simpler to install. The disclosed thermally actuated valves, in both the configurations described (FIGS. 3 and 5), and particularly their actuators that are based on bi-phase fluid, are deemed novel. A thermal water diverter as disclosed herein may be deployed also in other systems and applied to handle also other types of liquids.

A system, such as that depicted in FIG. 1, may include one or more TWDs, each serving a corresponding group of outlet devices and all configured to supply excess water to the AT 1. If a single TWD is deployed, it may be placed at the top of AT 1; it is however generally preferable to place the TWD as near the outlet devices as possible, so that the pipes leading to them be relatively short, thus minimizing the amount of cooled down water that is not diverted to the AT. If multiple TWDs are deployed, they are preferably configured to each serve a nearby group of outlet devices and placed accordingly.

Figure 6:
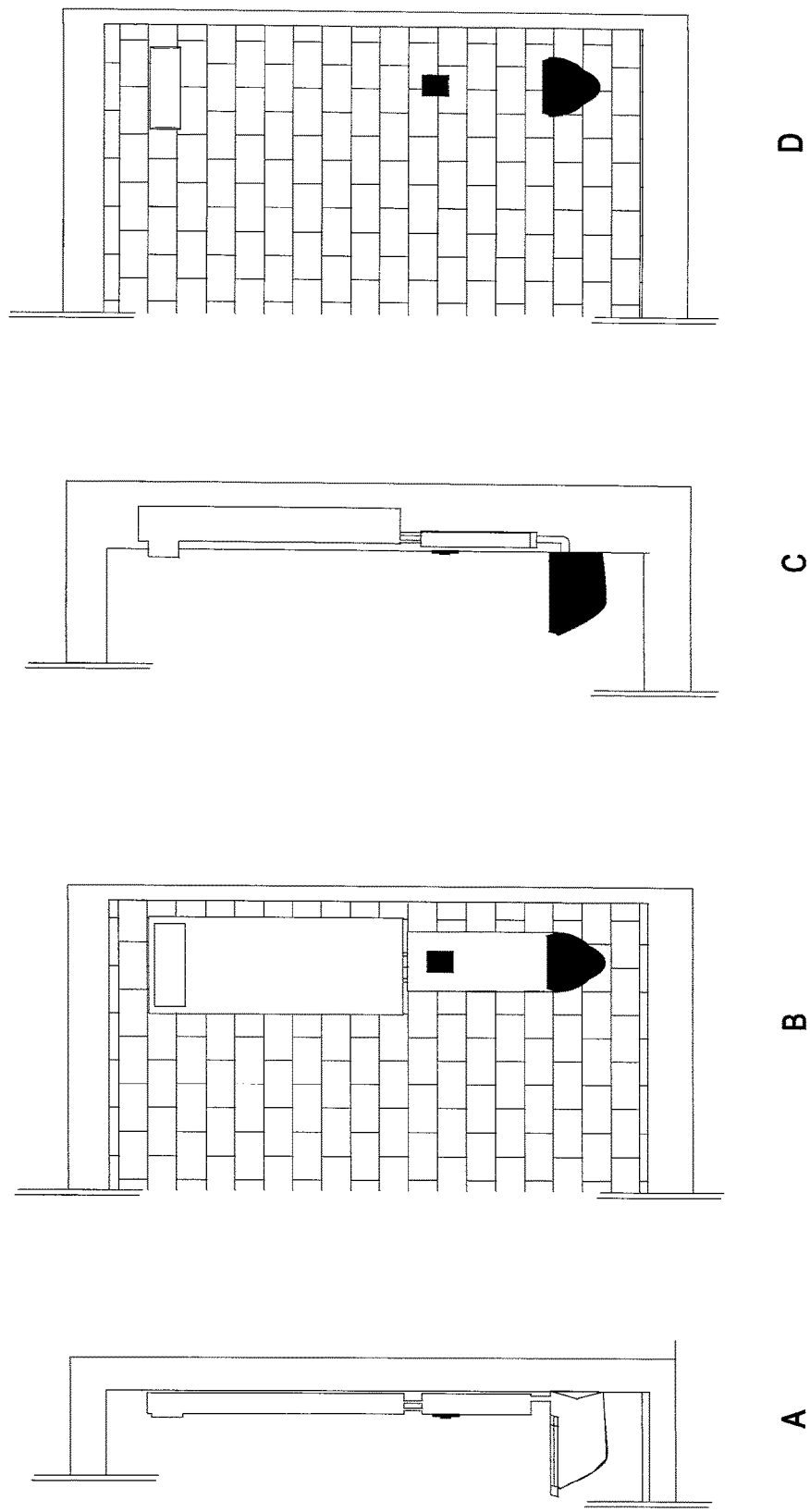
FIG. 6 is an architectural drawing, illustrating one manner of installation of the tank of FIG. 2.

Turning now to FIG. 6, there are shown architectural drawings that illustrate typical manners of installing the accumulation tank 1. Drawings A and B depict, in front- and side views, respectively, installation of the AT on a wall. It is seen to be installed directly above a toilet flushing tank This is suitable when also the flushing tank is installed on the wall or when the AT is added to an existing installation. Drawings C and D depict, in front- and side views, respectively, installation of the AT inside a wall—again, directly above an in-wall flushing tank; in this case, a window in the paneling allows access to the service port of the AT.

Figure 7:
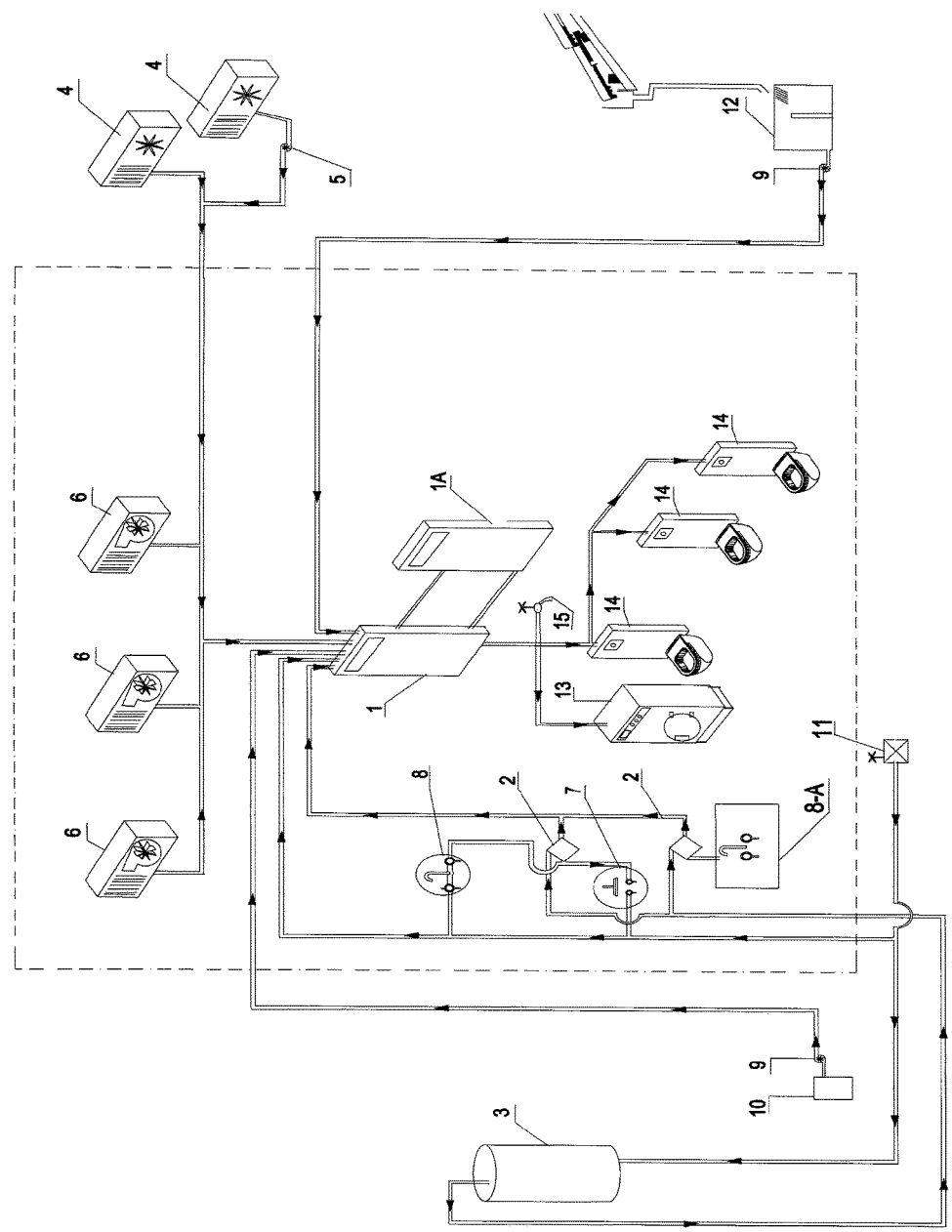
FIGS. 7A, 7B is are schematic drawings, illustrating two additional configurations of the system of FIG. 1.
Figure 7:
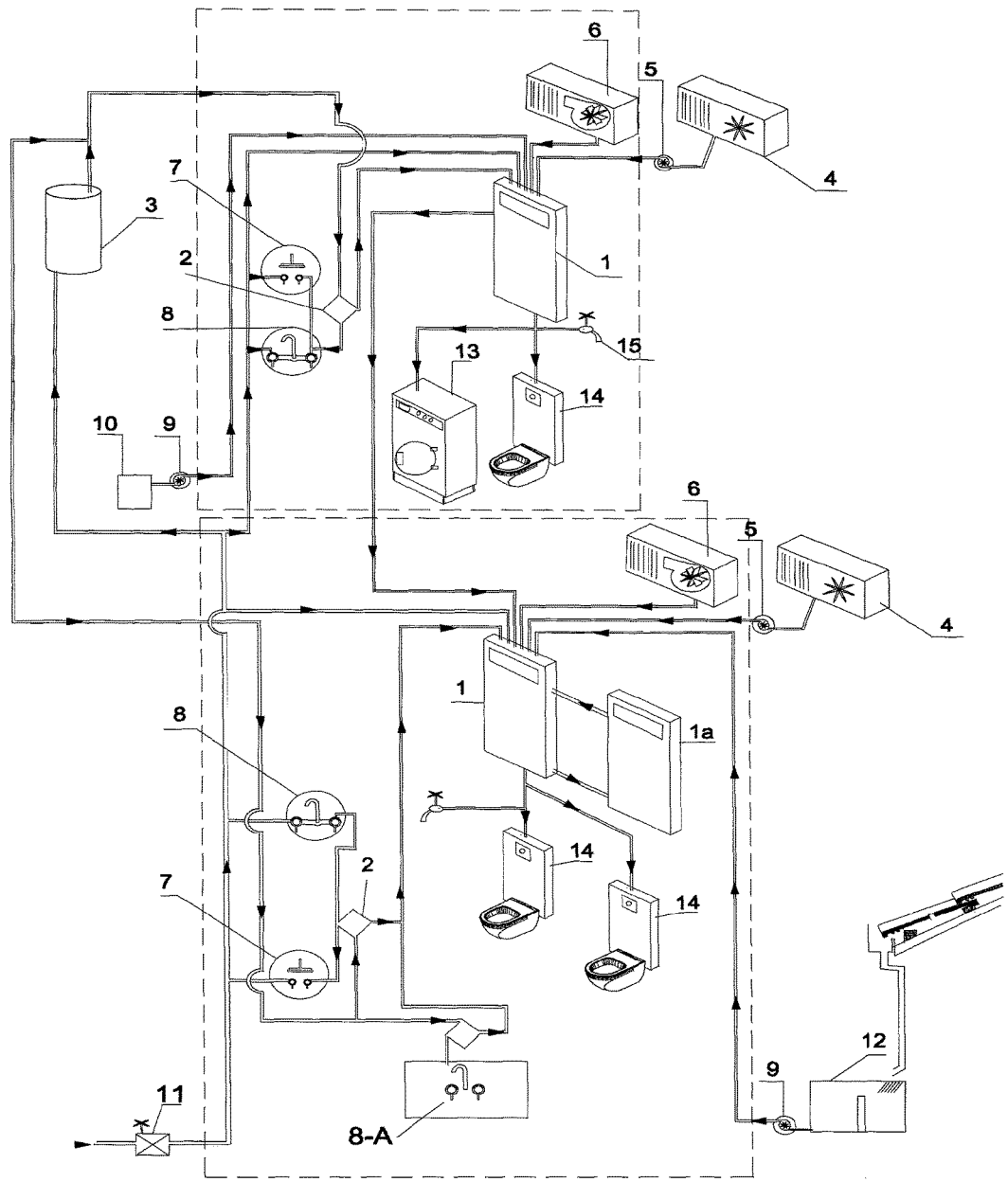

Turning now to FIG. 7A, there is shown schematically another configuration of a system for collecting and accumulating excess water and for delivering accumulated water to consumption devices. It is generally similar to the configuration of FIG. 1, but includes more elements and serves as an example of a system that may serve a large building unit, such as a large apartment. At its center is, again, an accumulation tank (AT) 1. The system includes, in particular, a plurality of air-conditioning units—three outdoor units 6 and two indoor units 4. All are seen to be connected by a network of pipes to one or more inlet ports of the AT. Excess cool water from hot-water pipes is seen to be diverted from outlets at two sinks and a shower. One diverter (TWD) 2 is shared by one sink and the shower. Among consumption devices, three flushing tanks 14 are seen to be feedable from one or more of the outlet ports of the AT. There is also provided an extension tank 1A, which is externally similar to AT 1 and may be of the same or different size, but lacks all the inlet- and outlet ports, as well as all the internal components of the AT. Extension tank 1A is connected with the AT 1 by a pair of pipes, which provide fluid communication therebetween. Tank 1A serves to, in effect, expand the capacity of the AT, as may be necessary for a large system, without the expense of an additional AT. Alternatively, a plurality of accumulation tanks may be deployed, each connected to some of the excess water sources and to some of the consumption devices. The advantage of a single AT, however, is that it better averages out variations in supply- or consumption rates among the various devices.

Turning now to FIG. 7B, there is shown schematically and by way of example yet another configuration of a system similar to that of FIG. 1. This one may be suitable, for example, for a two-story dwelling unit. As in the configuration of FIG. 7A, a plurality of source devices and of consumption devices are shown—arranged schematically in their respective stories. Again, a single accumulation tank is deployed, being fed by, and feeding, the various devices. Clearly other configurations are possible, including those with a plurality of accumulation tanks, all being within the scope of the presently disclosed invention.

INDUSTRIAL APPLICABILITY

The system and all its components, as disclosed herein, can be manufactured in conventional shops, using conventional processes, known in the water storage and transport industry. The system and its components can be installed in any building unit during construction or during renovation or as an add-on operation.

The invention claimed is:

1. A system for collecting and accumulating excess water from one or more sources in a building and delivering said water to one or more flushing toilet tanks as required by any of them;
the system comprising—
an accumulation tank, including a fresh-water inlet port, at least one excess-water inlet port and at least one outlet port, located at the bottom of the tank,
at least one inlet conduit, connecting between an excess-water source and a corresponding one of said excess-water inlet ports, said excess-water source being selectable from among (a) a condensate collecting pan of an air conditioner, (b) a hot water supply pipe that leads to one or more outlet devices and (c) a rainwater collector, and—
at least one outlet conduit, connecting between a corresponding one of said outlet ports and corresponding one or more of said flushing toilet tanks;
wherein
the connection of any of said inlet conduits with any hot water supply pipe is by means of a thermal water diverter, interjected in said hot-water supply pipe;
said accumulation tank further includes a water level control mechanism, which includes a valve, connected to said fresh-water inlet port;
the system further comprises a conduit connecting between said fresh-water inlet port and the main water supply system in the building;
said control mechanism is configured to let fresh water flow into the accumulation tank when, and only when, the level of accumulated water in the tank is below a given value;
the connection between each of said outlet conduits and each corresponding flushing toilet tank is the sole inlet connection of said toilet tank; and
the system is configured to operate automatically and let water flow through each of said outlet conduits by gravity.

2. The system of claim 1, further comprising at least one additional conduit that connects between a corresponding one of said outlet ports and one or more other water consumption devices and is configured to let water flow by gravity from the accumulation tank to said other consumption devices.

3. The system of claim 2, wherein said other water consumption devices are selectable from among a washing machine and a utility faucet.

4. The system of claim 1, comprising at least two inlet conduits, connected to mutually different excess-water sources.

5. The system of claim 1, further comprising an extension tank, in fluid communication with said accumulation tank and configured to feed water thereto by gravity.

6. The system of claim 1, wherein at least one of said excess-water sources is a hot-water supply pipe that leads to one or more outlet devices, and wherein said thermal water diverter is configured to automatically divert all of the water flowing through said supply pipe to the corresponding inlet conduit while, and only while, pressure of the water between the diverter and any of said outlet devices is low and the temperature of water flowing through said supply pipe is below a given value.

7. The system of claim 6, wherein the thermal water diverter includes at least one thermally actuated valve.

8. The system of claim 7, wherein said thermally actuated valve includes an actuator that contains a bi-phase fluid.

9. The system of claim 6, further comprising a flow duration limiter, interjected between the water diverter and the corresponding inlet conduit and configured to automatically allow the flow of diverted water into the accumulation tank for only a given duration of time from the inception of said diversion, said duration being adjustable.

10. The system of claim 9, wherein the flow duration limiter includes a water-pressure actuated valve.

11. The system of claim 9, wherein the flow duration limiter is configured to be automatically reset, so as to automatically enable repeated periods of flow of diverted water.

12. An accumulation tank, configured to be installed in a system for collecting and accumulating excess water from one or more sources in a building and to serve as a source of water to one or more flushing toilet tanks, the accumulation tank comprising—
at least one excess-water inlet port, configured to receive excess water from any of said sources;
at least one outlet port, located at the bottom of the tank and configured to deliver water therefrom to one or more of said flushing toilet tanks by gravity and without the use of any electrical device or component;
a fresh-water inlet port, configured to receive water from a fresh water supply system in the building; and a water level control mechanism, connected to said freshwater inlet port and including—
- a valve, configured to let fresh water flow into the accumulation tank
- a lever, attached to said valve,
- a bobbin, rotatably attached to said lever,
- a hanging string, the upper part of which is wound on said bobbin, and
- a floating weight, attached to the lower end of said string;

said control mechanism being devoid of any electrical device or component and configured so that while said weight floats on water accumulated in the tank, said valve is closed and while said weight freely hangs from said string, said valve is open and so that manual rotation of the bobbin causes the elevation of the weight, when freely hanging, to vary.

13. The accumulation tank of claim 12 comprising a service hatch, located at or near the top of the tank and configured to allow manual rotation of said bobbin.

* * * * *